March 24, 1970  H. J. A. VAN HELDEN ET AL  3,501,897

PROCESS FOR REMOVING SULFUR OXIDES FROM GAS MIXTURES

Filed Nov. 20, 1967

INVENTORS:
H. J. A. VAN HELDEN
J. E. NABER
F. J. ZUIDERWEG
H. VOETTER

BY: *Harold L Denkler*

THEIR ATTORNEY

United States Patent Office 3,501,897
Patented Mar. 24, 1970

3,501,897
PROCESS FOR REMOVING SULFUR OXIDES
FROM GAS MIXTURES
Henricus J. A. Van Helden, Jaap E. Naber, Frederik J. Zuiderweg, and Heinz Voetter, Amsterdam, Netherlands, assignors to Shell Oil Company, New York, N.Y., a corporation of Delaware
Filed Nov. 20, 1967, Ser. No. 684,187
Claims priority, application Great Britain, Nov. 28, 1966, 53,141/66
Int. Cl. B01d 53/04
U.S. Cl. 55—73
12 Claims

ABSTRACT OF THE DISCLOSURE

A process for removal of sulphur oxides from gas mixtures such as flue gases by means of a solid acceptor for sulfur oxide disposed in multiple open gas channels running parallel or substantially parallel having very low pressure drop and providing efficient sulfur oxide removal.

---

The invention relates to a process for the removal of sulfur oxides from gases containing sulfur oxides and oxygen by means of a solid acceptor. The invention also relates to a process for the regeneration of a solid acceptor which has been used for the removal of sulfur oxides from gaseous mixtures.

The term "sulfur oxides" used in this specification refers to both sulfur dioxide and sulfur trioxide. Under the conditions at which sulfur dioxide is removed with the aid of a solid acceptor, any sulfur trioxide present in the gaseous mixture is also removed.

As a result of increasing industrialization the prevention of air pollution is receiving more and more attention. In the past few years, the removal of sulfur oxides from gas mixtures, in particular from hot waste gases with relatively low sulfur oxides content—such as flue gases and gases from roasting processes—has become a significant commercial problem.

Although various processes for the purification of gaseous mixtures have been proposed, few of these are commercially suitable for reasons of heat economy. Processes aiming at the removal of sulfur oxides at relatively low temperatures are not of practical value for treating hot waste gases. These gases, which are produced in enormous quantities, would then have to be cooled down and, after removal of the sulfur oxides, heated again for suitable removal via a stack. An example of such a low-temperature process is one in which the gas to be purified is washed with a liquid.

A more attractive gas purification process comprises removing sulfur oxides by contacting the sulfur-oxides and oxygen-containing waste gases with a metal or a metal compound solid acceptor. Processes of this type may be conducted at flue gas temperature, i.e. at about 200–500° C. During contact the sulfur dioxide and/or trioxide are accepted (i.e. adsorbed or reacted) by the metal or metal compound on or in the acceptor. The hot purified gases may then be disposed of via a stack, without atmospheric pollution. Regeneration of the acceptor, i.e. removal of the accepted sulfur oxide gases, produces a gas which is considerably richer in sulfur dioxide than the flue gas. This sulfur dioxide rich gas may, for instance, be used as a starting material for the production of elemental sulfur or sulfuric acid.

The solid acceptor, which may be shaped into granules, pellets, or the like, may be used in the form of a fixed or a moving bed. However, industrial gases, such as flue gases, contain solid particles such as ash and soot, which clog or plug a fixed bed of acceptor after a relatively short time. A similar disadvantage occurs in a moving bed, where ash and soot particles tend to deposit on the surface of the granular acceptor, resulting in deactivation of the acceptor. Furthermore, the use of both free and moving acceptors results in pressure drops which often are not acecptable for flue gas treating.

Removal of the solid particles from the flue gas, for example, by means of an electrostatic precipitator may be used to prevent the problem described above but require large capital investment and is generally economically unattractive.

The present invention has an an object to provide a process in which the presence of solid particles in the gas does not result in clogging and deactivation of the solid acceptor. Further objects will become clear from the following description.

The invention is a process for the removal of sulfur oxides from a gaseous mixture containing sulfur oxides and oxygen by means of a solid acceptor suitable for accepting sulfur oxides, which process comprises conducting the said gaseous mixture through one or more open gas channels running parallel or substantially parallel and having walls designed and built such that acceptor material present on, in and/or behind said channel walls is freely accessible to said gas mixture.

In the process of the invention the acceptor is present on, in and/or behind the channel walls. The gaseous mixture flows through the gas channels which are substantially void and thus comes easily into contact with the solid acceptor by diffusion to the channel walls. During this contact the sulfur oxides in the gaseous mixture are accepted by the acceptor. On the other hand, any soot or ash particles in the gas can pass through the gas channels, from the inlet to the outlet, thus avoiding clogging of the system.

In the present process the gaseous mixture passes along rather than through a bed of the acceptor. Thus, by using open gas channels which are parallel or substantially parallel a much smaller pressure drop is obtained than with a fixed or moving bed, particularly if the gas channels are straight.

One embodiment of the invention is a process for the removal of noxious contaminants from gas mixtures by means of a solid acceptor suitable for accepting said contaminants, which apparatus comprises one or more open gas channels running parallel or substantially parallel and having walls designed and built such that acceptor material for accepting noxious contaminants which are present on, in and/or behind said channel walls are freely accessible to a gas mixture conducted through the said open gas channels.

In an advantageous embodiment of the invention the walls of the gas channels are permeable to gas and the acceptor is present between adjacent walls of two adjacent gas channels running parallel or substantially parallel. The fact that the walls are permeable to gas implies that the channel walls possess apertures and/or pores sufficiently large to enable the molecules of the gaseous mixture to pass through the walls by molecular diffusion, thus coming into contact with the acceptor behind the walls.

In a more specific embodiment of the invention the apparatus comprises an outer housing, one or more open gas channels formed by one or more sheets of gas-permeable material, running parallel or substantially parallel to the outer housing and at least one acceptor space formed either by the sheets of two adjacent parallel or substantially parallel gas channels or by the outer housing and the sheet facing that housing.

The apparatus of the invention may be used as such or it may be built into a flue gas line or a stack, the inner walls of the flue gas line or the stack thus forming the housing.

The solid acceptor may be present in the acceptor spaces in any suitable form, for instance, as granules or in the form of large solid blocks or elements. A structure comprising a number of acceptor spaces which are separated by gas channels is preferable.

Suitable gas-permeable channel walls consist of gauze which may be made of any suitable material, for instance, of metal or plastic wire. Gauze having a mesh size proportionate to that of the granular solid acceptor particles can be used. While part of the solid acceptor may distintegrate into smaller particles after a long time of use, these smaller particles, are easily retained by the larger particles, even if the gauze mesh is somewhat larger than the disintegrated particles. Consequently, loss of acceptor particles is negligible. The use of gauze having mesh sizes which are within the range of the sizes of the original acceptor particles has an economic advantage since large mesh gauze is less expensive than gauze with fine meshes. Furthermore, acceptor particles of smaller size than the gauze mesh can still be used when mixed with inert particles and/or acceptor material of a size larger than the mesh size of the gauze.

The gauze can, for instance, have openings of between 0.074 and 0.841 mm., gauze with openings of between 0.074 and 0.250 mm. are particularly preferred. However, gauze with openings outside these ranges can suitably be used.

In another embodiment of the invention the permeable channel walls are covered with gas-permeable filter material. The filter material is placed in the inside of the acceptor space and/or in the gas channel space. Molecules of the gaseous mixture pass through the filter material and come into contact with the solid acceptor. Solid particles present in the gaseous mixture do not pass through the filter material but are carried along the channel to the outlet side, so that clogging and deactivation does not occur. The filter material also prevents acceptor particles from passing into the gas channels, preventing disintegration of acceptor particles into very small particles which would result in a loss of acceptor. The filter material is kept in place by any suitable means, such as perforated plates, wires or coarse gauze. Thus, in this embodiment the use of fine gauze, such as the gauze with openings with a width between 0.074 and 0.841 mm., as mentioned above is not required. Any suitable type of filter material may be used, for example, woven-fabric filters or felt-fabric filters.

The gas-permeable filter material itself can contain solid acceptor, the filter material being impregnated with acceptor. The perforated plates, wires or coarse gauze may also be coated with solid acceptor, prior to or after assembly.

According to another embodiment of the invention, the sulfur-oxides and oxygen-containing gas mixture is passed through an apparatus comprising one or more blocks or elements provided with open gas channels. These blocks or elements which are rigid structures, may consist of a solid material made from inert base materials of such as, for example, catalyst supports, and from solid acceptor. The base materials and the elements made therefrom should have adequate strength and withstand the temperatures used for the removal of the sulfur oxides. They should also be resistant to chemical attack by sulfur oxides or by any other components occurring in the gaseous mixture. Examples of suitable material are alumina, silica, silica-alumina and/or silica-magnesia, with or without a preceding acid treatment; in addition, ceramic materials as well as compositions prepared on the basis of mixtures of sulfate-resistant cements and fillers.

The blocks or elements with parallel channels described above can be made in various ways. Thus, monolithic rigid structures may be obtained by starting from blocks in which the required channels have been provided by perforation or drilling. Smaller units having channels, etc., can be assembled by combining them to the desired larger structures with continuous channels. As a rule, however, it is simpler to make structures with channels by extrusion or by casting in a mold a composition which is either self-curing or which can be cured by setting agents or elevated temperature. The desired passages in the casting can be provided by tubes, which after curing are removed. If tubes are used which consist of the inert material described and, therefore themselves form the channels, they need not be removed from the cast structure.

An example of a self-curing composition suitable for the invention is a paste of water glass and, for example, alumina powder, which cures shortly after transfers to a mold.

Material from which the blocks or elements are made can consist of a composition which contains the solid acceptor. According to this embodiment, solid acceptor is used in the composition. The acceptor is thus uniformly incorporated in the structure and can serve without further treatment for acceptance of sulfur oxides. Obviously, the incorporated acceptor will yield better results if the structures are porous making accessible not only the wall surface itself, but solid acceptor inside the pores.

Porous blocks or elements comprising the solid acceptor may also be used in conjunction with gas-permeable channel walls consisting of gauze.

An alternative embodiment is that the walls of the channels, after completion of the rigid structure, are covered with a layer of acceptor material. The channel walls may, if desired be smooth, but it is preferable to use structures with a certain porosity, to increase the active surface area and to effect a better adhesion of the acceptor layer to the structure. As a rule, a thin layer of acceptor material, for example, of 0.1 to 2.0 mm. thickness, is sufficient.

The gas channels may have any suitable shape, although gas channels which are straight or substantially straight are preferred to achieve minimum pressure drop. The gas cahnnels may also be wavy. The cross-section of the gas channels (perpendicular to the direction of flow) may be rectangular or substantially rectangular. A packet of parallel sheets may be formed by fitting flat plates provided with acceptor material side by side in parallel position. A second packet of parallel plates, perpendicular or substantially perpendicular to the first packet of parallel plates can also be used. Both packets of parallel plates thus form a number of compartments, a kind of honeycomb structure or grid being obtained, which greatly increases the surface area available for the solid acceptor. Instead of flat plates, sheets in the form of thin screens can also be used.

The walls of the gas channels can be cylindrical with a central axis in common, the solid acceptor being located in the annular spaces between two adjacent walls of two adjacent concentric gas channels. In this case, it is possibel to provide the gas channels with a second layer of acceptor, running in the direction of flow and perpendicular to the annular spaces.

The channel walls can have the form of a spiral, which may be a rolled-up flexible mat. Another possibility is to apply one fixed bed of solid acceptor particles having gas channels with gas-permeable walls. In such a case one large fixed bed and a plurality of gas channels may be used. The walls can be made of gauze as the gas-permeable material. The fixed bed may have any suitable shape, for instance, a cylinder.

The supply of gas to the gas channels is preferably controlled in such a way to achieve turbulene flow. Turbulene flow promotes acceptance of sulfur oxides and prevents deposition of solid particles. Laminar gas flow can also be used but is not as effective.

The solid acceptor preferably has a grain size of from 0.05 to 5 mm., a grain size between 0.1 to 1 mm. being particularly preferred, although a grain size outside this range can be used in some applications.

The solid acceptor is preferably used in a layer of from 1 to 15 mm. thickness and more preferably of from 3 to 10 mm., measured in the direction perpendicular to the channel walls.

The gas channels preferably have a width of from 3 to 50 mm., measured in the direction perpendicular to the channel walls to maintain a pressure drop which will allow cleaned gases to be vented to a stack. Channel of widths between 5 and 20 mm. are especially advantageous. When long walls or screens are used it is advisable to maintain the distance between adjacent walls or screens by some rigid connections.

The pressure drop in the channels is at most 50 cm. and as a rule much less than 30 cm., for instance, from 2 to 10 cm. water column.

The pressure drop along the channels is affected, not only by the average diameter—and the length—but also by the shape of the cross-section of the channel and of the nature of the surface of the walls, e.g. smooth or rough. Thus, channels with circular, oval or wavy cross-sections will—at equal channel length—as a rule show somewhat lower pressure drop than channels with a square, rectangular or similar cross-section of equal surface area.

The number of gas channels and their dimensions are preferably chosen to give a linear gas velocity in the channels from about 2 to about 20 meters/second. At these velocities no ash or soot deposits on the channel walls, independent of whether the channels are located horizontally or vertically. Linear gas velocities of from 10 to 20 meters/second are especially preferred.

The length of the channels is principally determined by the concentration of the sulfur oxides at the inlet of the gas channels, the desired concentration of sulfur oxides at the outlets of the gas channels, the linear velocity of the gaseous mixture in the gas channels, the diameter of the gas channels and the activity of the acceptor. In general, the length of the channels should be greater than the length necessary for one theoretical mass transfer stage. For practical purposes the length of the channels are chosen to give 5–10 theoretical mass transfer stages. Gradual loading of the acceptor with sulfur oxides results in the most efficient operation. The effectiveness of the acceptor material is determined by the maximum loading permissible with the sulfur oxide concentration at the channel outlet.

As stated above, the solid acceptor present on, in and/or behind the channel walls preferably consists of a solid carrier material comprising one or more metal compounds, and the process conducted at flue gas temperatures. Suitable carrier materials are solids which are resistant to high temperatures. As, for example, alumina, silica, silico-alumina, silica-magnesia, bauxite and/or natural clays, whether or not pretreated with acid. A very suitable carrier material comprises $\gamma$-alumina. To obtain a high degree of loading it is desirable that the carrier material have a relatively large specific surface area; preferably at least 100 m.$^2$/g. Surface areas of 150 to 300 m.$^2$/g. are particularly preferred. Commercial $\gamma$-alumina grades having an average pore diameter of 65–100 A., a pore volume of 0.30–0.60 ml./g. and a specific surface area of 160–230 m.$^2$/g. are particularly suitable.

An appropriate solid acceptor is an alkali metal oxide supported on a carrier, such as alumina. However, the regeneration of this acceptor—with a reducing gas, such as a light aliphatic hydrocarbon—must be effected at about 600° C., which temperature is considerably higher than flue gas temperatures.

A preferred solid acceptor comprises an alkali metal compound promoted with a vanadium compound. This acceptor is described in the co-pending British patent application No. 36809/67. This acceptor may be used at flue gas temperatures, during acceptance as well as during regeneration of the loaded acceptor. Preferably, the alkali metal compound is potassium oxide or sodium oxide and the vanadium compound is a vanadium oxide and, more preferably, vanadium pentoxide.

A particularly preferred solid acceptor which also can be regenerated at flue gas temperatures comprises copper oxide as the metal compound. The copper content of this solid acceptor may vary within wide limits, depending on the specific surface area of the carrier material. As a rule it is at least 1% w. and preferably 5–15% w., calculated on solid acceptor. In general, the copper content will not exceed 25% w., calculated on solid acceptor. The copper content, of course, influences the quantity of sulfur oxides that can be combined per unit weight of acceptor.

The acceptance of sulfur dioxide from e.g. flue gases, which proceeds under oxidative conditions in the presence of oxygen, is effected at a temperature above 300° C. A higher acceptance temperature results in a higher load of sulfur dioxide on the acceptor. However, the process is preferably carried out at a temperature below 450° C. In particular, the acceptance is effected at temperatures of from 325 to 425° C.

The acceptors used in the process according to the invention may be prepared by known techniques. One appropriate method being the impregnation of the carrier material with an aqueous solution of a copper salt with subsequent drying and calcining. Another suitable method is intimate mixing the copper compound and the carrier material through coprecipitation, with subsequent drying and calcining.

As observed above, the copper-containing acceptors and acceptors containing an alkali metal compound promoted with a vanadium compound have the great advantage that, when loaded with sulfur oxides, they may be regenerated by treatment with a reducing gas or gas mixture. This regeneration may take place at temperatures similar to, or slightly higher than, those at which the acceptor was loaded. Since the acceptance of sulfur oxides proceeds at temperatures of from 300 to 450° C., regeneration is as a rule effected at temperatures of from 300 to 500° C., in particular at temperatures of from 350 to 450° C.

Operating at acceptance and regeneration temperatures which differ only slightly is not only advantageous from the point of view of heat economy but is also very important for acceptor life. When, for instance, sulfur dioxide has to be removed from flue gases, economic operation requires that the acceptor serves in the process for a long time. Thus it should be possible to regenerate the acceptor preferably several hundred times without significant activity decline. Heating of acceptor over a wide temperature range and the cycle heating and cooling step required would seriously damage both the chemical and physical stability of the acceptor material.

In the regeneration of a copper-containing acceptor two stages may be distinguished. In the first stage the acceptor loaded with copper sulfate is treated with a reducing gas. In addition to cuprous oxide some metallic copper and/or cuprous sulfide is generally formed. The second stage is oxidation with an oxygen-containing gas, for which the sulfur-oxides and oxygen-containing gas to be purified may be used. After acceptance-regeneration cycles, the copper containing acceptors often display a greater activity for the removal of sulfur dioxide than the fresh material.

Suitable reducing gas for the regeneration is, for instance, hydrogen or carbon monoxide or a gas mixture containing hydrogen and/or carbon monoxide. However, a low-molecular hydrocarbon or a mixture of such hydrocarbons may also be very conveniently applied. Examples of low-molecular hydrocarbons which are useful are methane, ethane, propane, butane and the like, or technical mixtures, such as natural gas or tops products such as obtained, in the straight-run distillation of petroleum.

The gas flow during acceptance and during regeneration may be in the same or opposite direction. Considerable pulverization of the solid acceptor particles, however, occurs after a number of acceptance-regeneration cycles if the same flow direction is used. Pulverization is more serious at the outlet opening of the gas channels than at the inlet opening. The crushing strength of the non-pulverized solid acceptor particles is lower at the outlet opening of the gas channels than at the beginning. These two phenomena occur, not only when the open gas channels are used according to the invention, but also when the fixed beds are used. Therefore, the direction of flow of the reducing gas or gas mixture is preferably opposite to the direction of flow of the gaseous mixture during the previous loading of the acceptor. In the latter case no pulverization of solid acceptor particles and no decrease of their crushing strength has been observed in that part of the gas channels where the reducing gas or gas mixture is introduced. Furthermore, smaller quantities of the reducing gas or gas mixture are required than for the case where the said directions are the same; therefore, the regeneration proceeds at a more rapid rate. Consequently, the concentration of sulfur dioxide in the regeneration effluent gases leaving the open gas channels is higher, which is advantageous in recovery of the sulfur. An additional advantage for the above-mentioned copper-oxide-containing acceptor is that part of the required heat for the regeneration (heat required for the decomposition of the copper sulfate formed during the acceptance) is generated by partial combustion of the reducing gas. The copper oxide present at the end of the gas channels (seen from the direction of flow during the acceptance) which during operation has not been converted into sulfate, acts as an oxidizing agent to form partially oxidized reducing gas and metallic copper. In some cases it may be advantageous to start the next loading cycle of the solid acceptor by introducing the sulfur-oxide-containing gaseous mixture at the same end of the reactor as that at which the previous regeneration gas stream was introduced.

The acceptance-regeneration cycle described in the foregoing is particularly suitable for a continuous embodiment of the process. For this purpose two reactors in parallel can be applied, using one of the reactors for the acceptance of sulfur oxides, while regenerating the other one.

In a suitable embodiment of the invention, the apparatus is provided with gas-permeable channel walls consisting of gauze, particularly wire gauze, as the gas-permeable material. Gauze having openings with a width between 0.074 and 0.841 mm. can be used. The channel walls may be covered with gas-permeable filter material, such as felt. The gas-permeable filter material itself can also contain solid acceptor.

The cross-section of the open gas channels can be rectangular or substantially rectangular, or have the form of a spiral which may be a rolled-up flexible mat. The channel walls can also be cylindrical with a central axis in common. In this case, the solid acceptor is located in the ring-shaped spaces between two adjacent concentric gas channels.

The invention is illustrated by means of the schematic drawing, in which, for reasons of simplicity, auxiliary equipment, such as bolts, nuts, valves, etc. is generally not shown.

Figure 1:
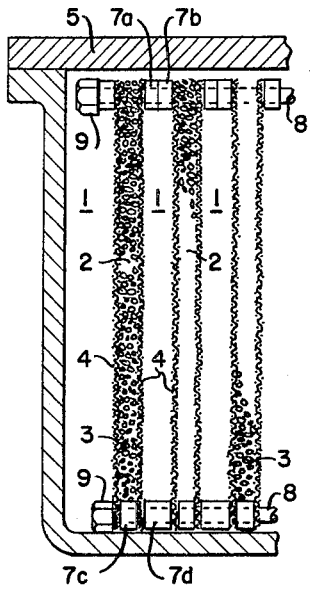
FIGURE 1 is a cross-section of a reactor provided with acceptor spaces.

FIGURE 1 shows three open gas channels 1, running parallel and through which a sulfur-oxide-containing gaseous mixture can be passed. Gas channels 1 are separated from each other by means of acceptor spaces 2, which are filled with solid acceptor particles 3. Gas channels 1 have gas-permeable walls 4, which in the case represented are made of gauze, so that particles 3 are between two layers of gauze. Any gas flowing through channels 1 easily contacts acceptor particles 3 and no clogging occurs. Gas channels 1 and acceptor spaces 2 run in the same direction and are placed in a frame or housing 5. The apparatus may also be placed in a flue gas line between a furnace and a stack, in which case 5 represents the flue gas line wall. This reactor cay be modified by providing it with a second number of parallel acceptor spaces running perpendicular to the acceptor spaces 2 in order to form a number of compartments through which the gaseous mixture may flow.

Figure 2:
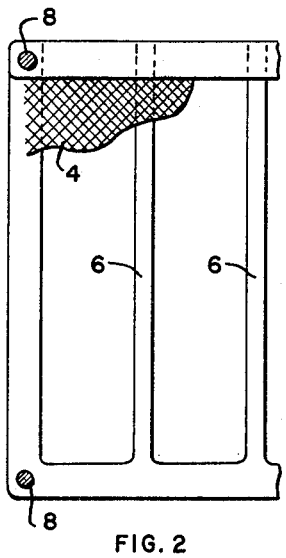
FIGURE 2 is a front view of the apparatus shown in FIGURE 1.

FIGURE 2 is a front view of the embodiment shown in FIGURE 1, and more particularly a front view of an acceptor space 2. The gas-permeable wall 4, is made of gauze of a mesh size capable of retaining the acceptor particles 3. The gauze is kept in place by supporting means 6, to which it may be fastened in any suitable manner. In the case represented walls 4 are rectangular. The acceptor spaces 2 are separated from each other by means of bolt 8 provided with a nut 9.

Figure 3:
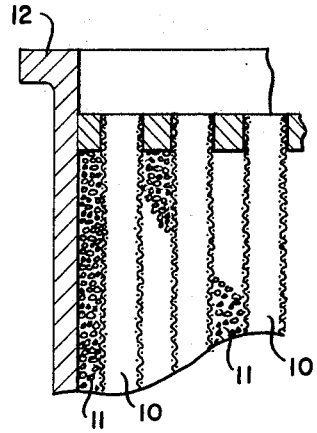
FIGURE 3 is a cross-section of a cylindrical acceptor bed with gas channels running through the bed.
Figure 4:
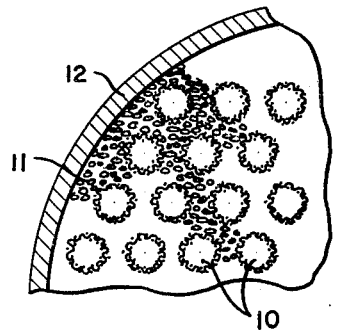
FIGURE 4 is a top view of the apparatus shown in FIGURE 3.

Another embodiment of an apparatus for the process of the invention is represented in FIGURES 3 and 4. A number of parallel-running gas channels 10 are surrounded by acceptor particles 11 placed in a cylindrical housing 12. The acceptor particles form together a fixed bed. The walls of gas channels 10 are made of gas-permeable material, for instance, of gauze. Gas channels 10 are open at both ends.

Figure 5:
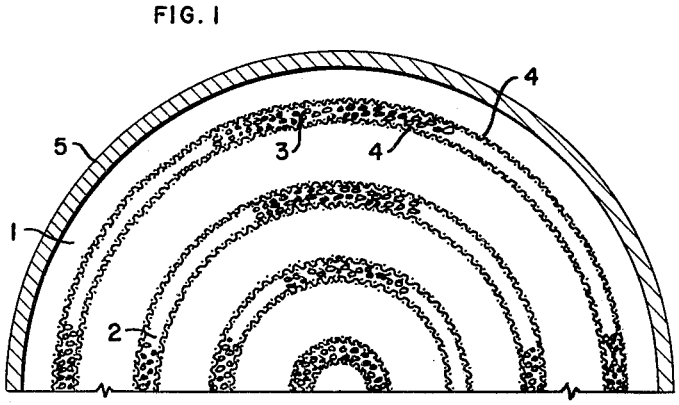
FIGURE 5 is a top view of an apparatus provided with ring-shaped acceptor spaces.
Figure 6:
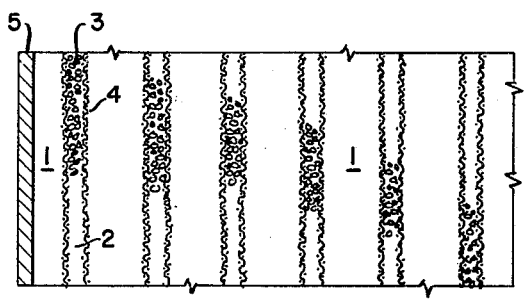
FIGURE 6 is a cross-section of the apparatus shown in FIGURE 5.

Still another embodiment of an apparatus for the process of the invention is shown in FIGURES 5 and 6. In this case a number of ring-shaped acceptor spaces, and a number of ring-shaped gas channels, have a central axis in common. The reference numerals are the same as those of FIGURES 1 and 2.

Although the apparatus of the invention has in particular been described in connection with the removal of sulfur oxides it will be clear that it may be used for the removal of any noxious contaminant from gas mixtures with any type of solid acceptor for the said contaminant.

The invention is further elucidated by means of the following examples.

EXAMPLE I

To remove sulfur dioxide from a sulfur-dioxide and oxygen-containing flue gas from an oil-fired furnace a vertically placed cylindrical housing was used, having at the bottom a gas supply line and at the top a gas discharge line. In the housing, fitting against the wall, a rigid structure consisting of a cylindrical block with a diameter of 50 cm. and a length of 220 cm. was placed. The cylindrical block was made of refractory, acid-resistant material having 1000 channels, fitted parallel to the axis of the housing. The channels—with a circular cross-section—had a diameter of 1 cm., giving total free area of 40%. The walls of the structure were coated with copper oxide supported on a commercial silica-alumina, with an average particle size of 0.06 mm., a specific surface area of 408 m.$^2$/g. and a pore volume of 0.50 ml./g.

The flue gas—with a sulfur dioxide concentration of 0.21% v.—was passed through the rigid cylindrical structure at a rate of 2260 standard cubic meter/hour, which corresponds with an actual rate in the channels of 21 meters/second at the flue gas temperature of 350° C.

The flue gas was passed through the rigid structure for 20 minutes and at the end of that period the concentration of sulfur dioxide in the gas discharged was 0.057% v., being 27% of the $SO_2$ concentration in the flue gas supplied. Based on the total quantity of $SO_2$ passed through the structure 84% of the $SO_2$ was retained and 16% passed through with the flue gas. The quantity of sulfur dioxide accepted by the acceptor material corresponds with an active acceptor layer on the channel walls of 1-2 mm. thickness; the channel length corresponded with about 5 transfer stages. No clogging of the open gas channels was observed.

EXAMPLE II

To remove sulfur dioxide from a sulfur-dioxide and oxygen-containing flue gas originating from a boiler house, a vertically placed reactor was used, provided at the bottom with a gas inlet and at the top with a gas outlet. The reactor comprised essentially a gauze tube of 1 cm. internal diameter and 210 cm. length with a 0.2 cm. layer of solid acceptors on the outside. The openings in the gauze had a width of 75 microns (200 mesh). The acceptor had a particle size of 0.05-0.1 cm. and consisted of 8.3% w. copper on γ-alumina (calculated on solid acceptor). The concentration of sulfur dioxide in the flue gas was 0.30-0.40% v.

Two tests with two samples of the same acceptor were carried out in this reactor. In both tests the total time for the acceptance and one regeneration cycle was 35 minutes; the gas hourly space velocity during acceptance being 12,000-13,000 standard liters/hour. The actual flue gas velocity in the tubes was in the range of 10-20 meters/second during acceptance. In one test the acceptor was regenerated with methane at 450° C., in the other the acceptor was regenerated with propane at 400° C. Some data are given in Table I below.

TABLE I

| | Test 1 | Test 2 |
|---|---|---|
| Actual total running time, in hours | 2,029 | 1,332 |
| $SO^2$ accepted during test, w $SO^2$/w acceptor | 44 | 52 |
| Temperature during acceptance and regeneration, in ° C | 450 | 400 |
| Gas hourly space velocity (regeneration), in standard liters/liter hour | 200-300 | 210-260 |
| Regeneration gas | $CH^4$ | $C^3H_8$ |

At the end of both tests it was found that the acceptor was not plugged by solid particles present in the flue gas from the boiler house. The acceptor had not lost its activity; the $SO_2$ removal per cycle during the total running time had not changed and therefore was equal to the average $SO_2$ take-up per cycle. The average $SO_2$ load per cycle was higher during Test 2 than during Test 1, so that accepting and regenerating at low temperatures with propane has a beneficial effect on the chemical properties of the acceptor.

At the end of the tests it was found that 20-30% w. of the acceptor particles had disintegrated to a particle size of below 44 microns. However, the reactor still contained the original quality of acceptor. The fines formed by the disintegrated particles apparently agglomerate and do not escape through the pores in the gauze tube.

EXAMPLE III

Test 2 described in Example II was discontinued and Test 1 was continued to investigate the lifetime of the solid acceptor. The conditions during this continued operation were the same as those for Test 1 described in Example II. After an actual total running time of 4607 hours 72 g. $SO_2$ had been accepted per g. of acceptor. The stability of the chemical activity with respect to acceptance and regeneration was very good, no change being observed in the $SO_2$ removal per cycle during the total running time. At the end of the continued operation it was found that 40-50% w. of the acceptor particles had disintegrated to a particle size of below 44 microns. However, the reactor still contained the original quantity of acceptor.

EXAMPLE IV

In this example the favorable effect of flow direction of the reducing gas and flue gas was studied.

A cylindrical reactor tube was used with an internal diameter of 4.0 cm. The tube was filled over a length of 12 cm. with a bed of solid acceptor particles of 3 mm. grain size and 16 kg./cm.² crush strength. The acceptor consisted of 8.3% w. copper on γ-alumina. First, acceptance regeneration cycles were carried out, all in downflow, the direction of flow of the reducing gas ($CH_4$) being the same as the direction of flow of the gaseous mixture during the previous loading of the acceptor. After 758 cycles, samples of the acceptor particles were taken in the upper, middle and lower parts of the bed. The samples were sieved to determine the degree of pulverization and the crushing strength of the non-pulverized particles was determined. The results are shown in Table II below.

TABLE II

| Sample | Pulverization, Percent w of Particles <3 mm. | Crushing Strength, kg./cm.², of Particles 3 mm. |
|---|---|---|
| Upper part | 4 | 4.7 |
| Middle | 12 | 2 |
| Lower part | 30 | <1 |

Then, acceptance was carried out in downflow and the subsequent regeneration in upflow. After 427 cycles, samples were taken and analysed as described above. The results are shown in Table III below.

TABLE III

| Sample | Pulverization, Percent w of Particles <3 mm. | Crushing Strength, kg./cm.², of Particles 3 mm. |
|---|---|---|
| Upper part | 17 | 2 |
| Middle | 6 | 6 |
| Lower part | 0 | 16 |

A comparison of the results shown in Tables II and III shows that opposite directions of flow for operation and regeneration greatly increases crushing strength retention and reduces pulverization.

We claim as our invention:

1. A cyclic regenerative process for removing sulfur oxides from flue gas by means of a solid acceptor suitable for accepting sulfur oxides comprising, conducting the flue gas at a temperature of from about 200 to about 450° C. and at a linear velocity of from about 2 to 20 meters per second through a plurality of straight, parallel open gas channels having a solid acceptor comprising a metal freely accessible to the flue gas, said channels being from about 3-50 mm. wide and of such length that the flue gas passing through the channels experiences a pressure drop of less than 50 cm. of water, stopping the flow of flue gas when the acceptor is at least partly loaded with sulfur oxide, and passing a reducing gas through said channels at a temperature of from about 300-500° C. until the ability of the acceptor to accept sulfur oxides has been restored.

2. The process of claim 1 wherein two sets of parallel channels are maintained, one of which is being regenerated while the other is accepting sulfur oxides.

3. The process of claim 1 wherein reducing gas passes through the parallel channels in a direction opposite the direction that flue gas passes through said channels.

4. The process as of claim 1, in which the walls of the gas channels are permeable to gas and the acceptor is present between adjacent walls of two adjacent gas channels running parallel or substantially parallel.

5. The process of claim 1, in which the open gas channels possess gas-permeable walls within a fixed bed of solid acceptor particles.

6. The process of claim 1, in which the gas-permeable walls of the gas channels consist of gauze which has openings with a width between 0.074 and 0.841 mm.

7. The process of claim 1, in which the channel walls are covered with gas-permeable filter material.

8. The process of claim 7, in which the gas-permeable filter material itself contains solid acceptor.

9. The process of claim 1, in which the solid acceptor is used in a layer thickness of from 1 to 15 mm., measured in the direction perpendicular to the channel walls.

10. The process of claim 1, in which the acceptor channels comprise one or more porous blocks or elements, the blocks being made of inert base material and the solid acceptor.

11. The process of claim 1, in which the solid acceptor contains 5–15% w. copper as copper oxide, calculated on solid acceptor.

12. The process of claim 11, in which the solid acceptor comprises a solid carrier material comprising an alkali metal compound promoted with a vanadium compound.

References Cited

UNITED STATES PATENTS

| | | | |
|---|---|---|---|
| 2,195,563 | 4/1940 | Granger | 55—387 |
| 2,732,074 | 1/1956 | Kuthe | 55—387 |
| 3,034,947 | 5/1962 | Conlisk et al. | 55—74 |
| 3,284,158 | 11/1966 | Johswick | 55—73 |
| 3,300,280 | 1/1967 | Terminet | 23—3.1 |
| 3,411,865 | 11/1968 | Pipers et al. | 23—178 |

REUBEN FRIEDMAN, Primary Examiner

C. N. HART, Assistant Examiner

U.S. Cl. X.R.

23—2, 178; 55—74